United States Patent Office 3,427,860
Patented Feb. 18, 1969

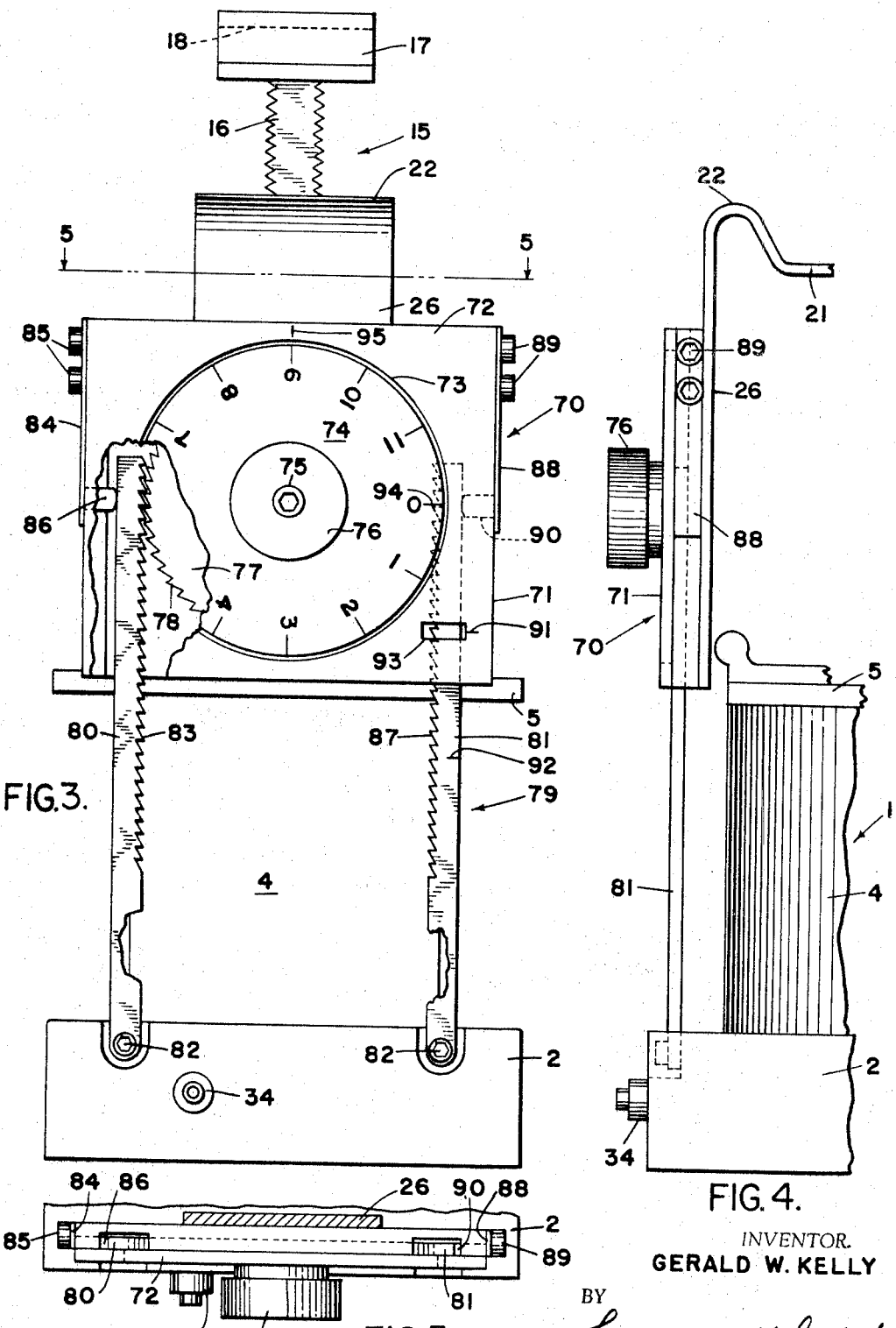

3,427,860
SHOCK ABSORBER TESTING APPARATUS
Gerald W. Kelly, Bridgeport, Mich., assignor to Wilson Engineering, Inc., Saginaw, Mich., a corporation of Michigan
Filed June 5, 1967, Ser. No. 643,646
U.S. Cl. 73—11                                16 Claims
Int. Cl. G01m *17/04*

ABSTRACT OF THE DISCLOSURE

A device for testing vehicle shock absorbers having a support reciprocable in a cylinder and including indicating means reciprocable with the piston and operated by an actuating member mounted on the cylinder to indicate the accumulative travel of the piston in both directions of its travel and thereby provide a measure of the efficiency of shock absorbers under test.

---

The invention disclosed herein relates to apparatus for testing the effectiveness of vehicle shock absorbers while they are mounted on the vehicle. Such testing of shock absorbers provides a much more accurate indication of the efficiency of the shock absorbers than can be obtained by testing them when disconnected from the vehicle. In addition, it is a time consuming and troublesome task to disconnect shock absorbers from a vehicle, test them, and reinstall them if they are satisfactory.

Apparatus constructed in accordance with the invention provides for the testing in an identical manner of each shock absorber with which a vehicle is equipped, thereby enabling the effectiveness of each such shock absorber to be ascertained and compared with shock absorber standards. This is accomplished by the initial location of a vehicle supporting, reciprocable member in a precisely determined location prior to testing each shock absorber, adjusting an indicating mechanism to an initial position, and suddenly removing the support for the reciprocable member, thereby enabling the weight of the vehicle to initiate reciprocation of the support member in accordance with the rebounding of the vehicle body. The number of rebounds will be inversely proportional to the effectiveness of the shock absorbers. The arrangement is such that the vehicle support member moves in opposite directions with the vehicle body and the movement of the support member in each direction effects accumulative operation of the indicating mechanism, thereby providing an indication of the total travel of the support mechanism. The total travel of the support mechanism member thus is directly proportional to the number of rebounds of the vehicle body.

A principal object of the invention is to provide apparatus for effectively testing vehicle shock absorbers without necessitating removal of the shock absorbers from the vehicle.

Another object of the invention is to provide apparatus of the character described which has a uniform initial testing position under all conditions of operation, thereby enabling accurate test data to be compiled.

A further object of the invention is to provide shock absorber testing apparatus which is portable, easy to use and relatively inexpensive to manufacture.

Other objects and advantages of the invention will be pointed out specifically or will become apparent from the following description when it is considered in conjunction with the appended claims and the accompanying drawings, in which:

FIGURE 3 is a view similar to FIGURE 1, but illustrating another embodiment of the invention;

FIGURE 4 is a fragmentary, side elevational view of the apparatus shown in FIGURE 3; and FIGURE 5 is a sectional view taken on the line 5—5 of FIGURE 3.

Figure 1:
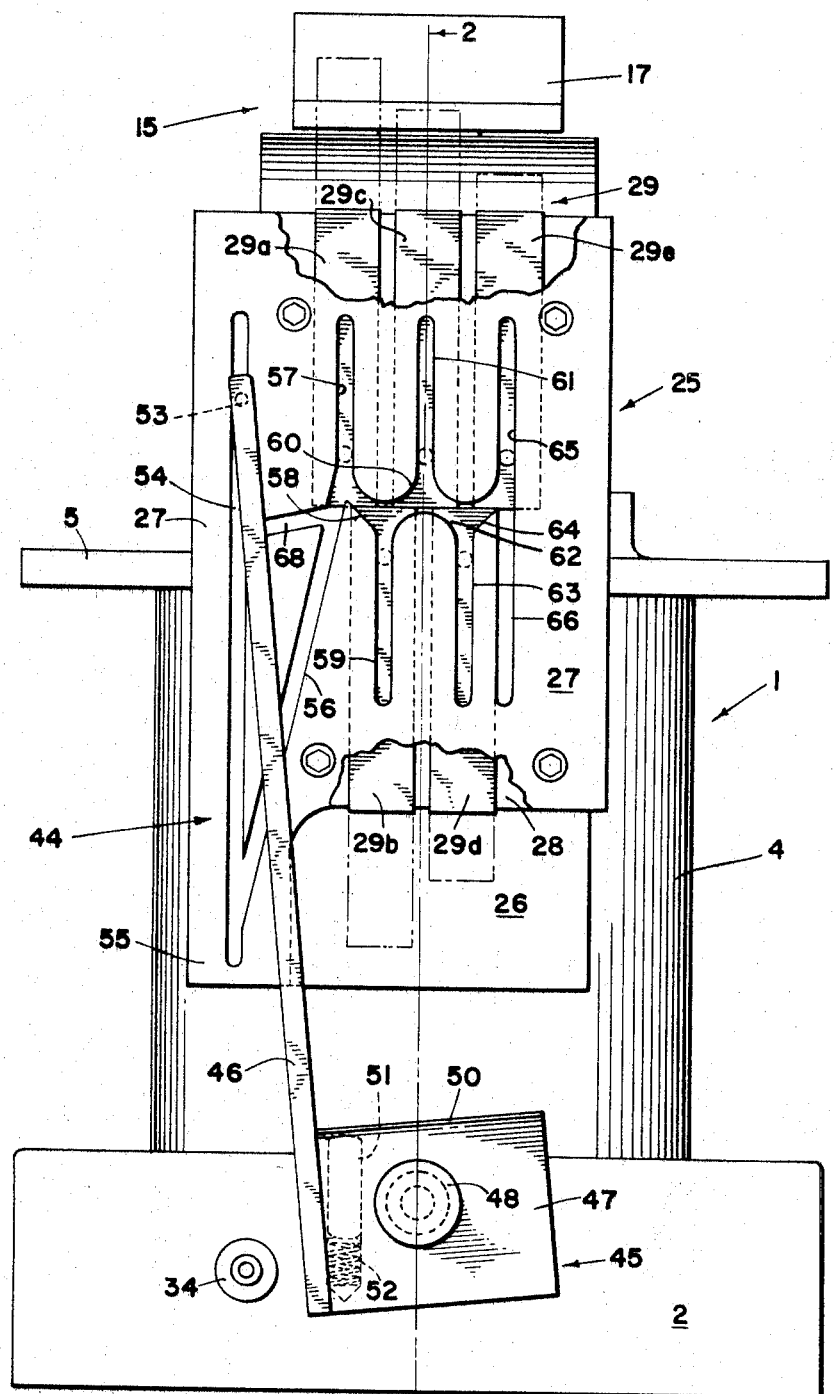
FIGURE 1 is a front elevational view of shock absorber testing apparatus constructed in accordance with one embodiment of the invention.
Figure 2:
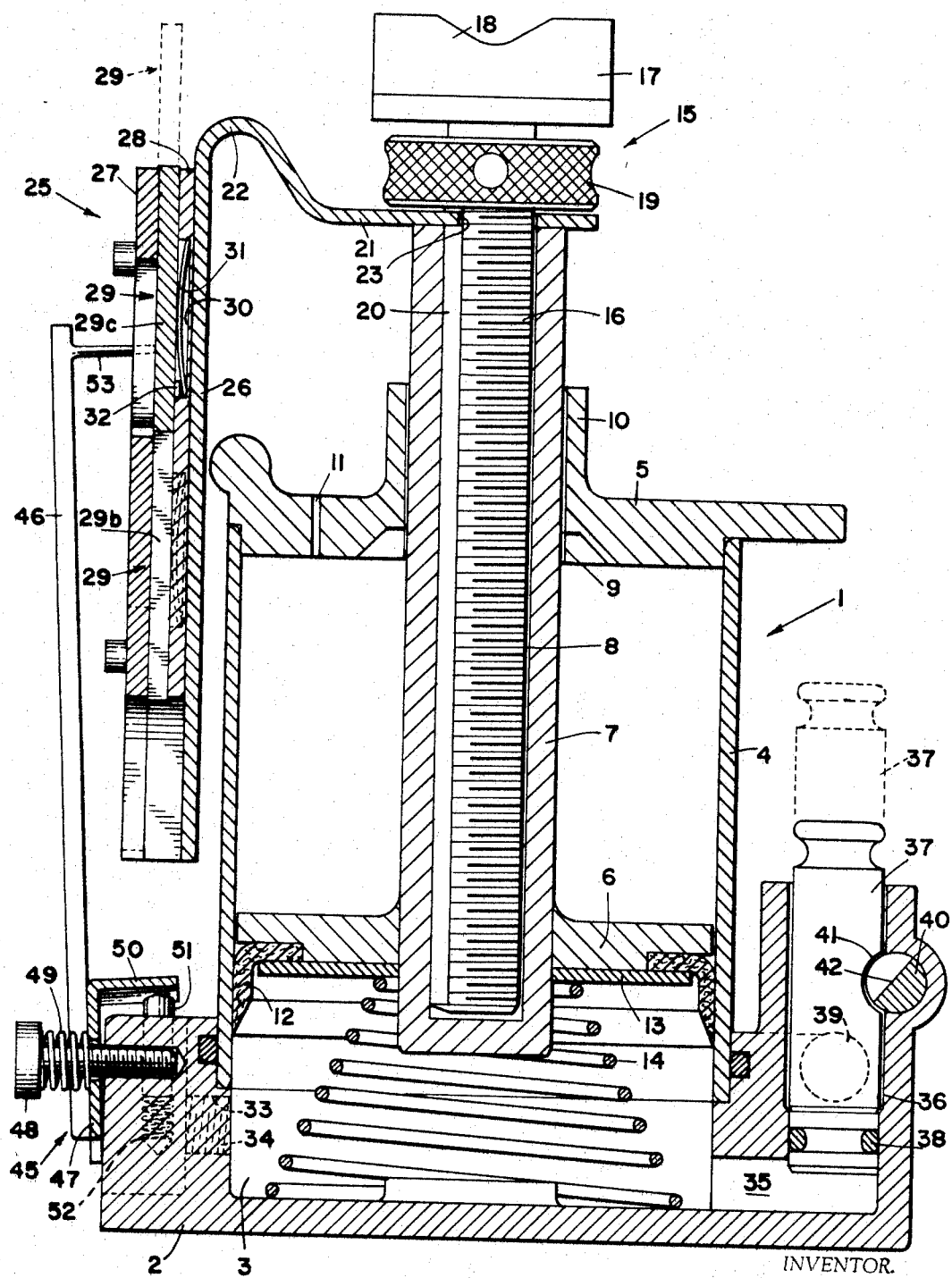
FIGURE 2 is a vertical sectional view taken on the line 2—2 of FIGURE 1.

Apparatus constructed in accordance with the embodiment illustrated in FIGURES 1 and 2 comprises a base 1 having a generally cup-shaped housing member 2 defining an annular chamber 3 in which is fixed a cylinder 4 that is closed in its upper end by a cap 5. Within the cylinder 4 is a reciprocable piston 6 that is secured to an upstanding piston rod 7 having a smooth, blind bore 8 formed therein. The piston rod passes through an opening 9 in the cap 5 and is guided in its movements by a tubular boss 10 forming part of the cap. The cap is vented by one or more passages 11.

On the lower or inner face of the piston 6 is fitted a leather or other suitable washer 12 which is maintained assembled with the piston by means of an annular disc 13 that is fixed to the piston by rivets (not shown) or the like. Between the piston 6 and the bottom 2 is a conical spring 14. The spring 14 functions to urge the piston and the piston rod 7 toward the end cap 5.

A standard 15 is carried by the piston and piston rod assembly and comprises a threaded shaft 16 that is accommodated within the bore 8 and which terminates at its upper end in a support block 17 in which there is a groove 18. Threaded onto the shaft 16 is a knurled nut 19 which may be rotated in one direction or the other so as to cause the shaft 16 to be extended or retracted relatively to the bore 8. The shaft 16 has a flattened surface 20 and passes through a flange 21 of a carrier plate 22 having a flat side 23 which cooperates with the surface 20 to prevent rotation of the shaft 16.

Indicating apparatus operable to indicate the accumulative vertical travel of the standard 15 is indicated generally by the reference character 25. The indicating apparatus is carried by a vertical flange 26 of the member 22 and comprises front and rear plates 27 and 28, respectively, between which is mounted a plurality of slidable indicating bars 29. As is best illustrated in FIGURE 1, there are five such indicating bars designated 29a through 29e. The rear plate 28 is provided with a slot 30 adjacent each of the indicator bars and in each slot is an arcuate spring 31 which bears against the rear surface of the associated indicator bar with sufficient force to maintain the latter in any selected position of adjustment. Each indicator bar is provided with a rearwardly projecting tongue 32 that extends into its associated slot 30 so as to preclude inadvertent removal of the indicator bars from between the plates 27 and 28.

In communication with the chamber 3 is a passage 33 in which is secured a fitting 34 that is adapted for connection to a source of pressure fluid such as compressed air. Also in communication with the chamber 3 is a passage 35 which leads to a valve chamber 36 in which is mounted a vertically reciprocable, rapidly acting valve 37 which is provided at its inner end with a sealing ring 38. In communication with the chamber 36 is an exhaust port 39 through which fluid from the chamber 3 quickly may be exhausted under the control of the valve 37. Means for controlling the valve 37 comprises a manually rotatable latch or key 40 of generally cylindrical figuration and which is adapted to fit into a groove 41 formed in the body of the valve 37 so as to lock the latter in a position in which the exhaust port 39 is closed. The latch 40, however, has a groove 42 therein which upon rotation of the latch counterclockwise from the position shown in FIGURE 2 enables the valve 37 to move upwardly to the dotted line position and uncover the exhaust port 39 so as to establish communication between the latter and the chamber 3.

The construction and arrangement of the parts thus far described are such that the base 1 may be positioned adjacent any one of the four wheels of the vehicle and the adjusting nut 19 manipulated to enable the block 17 to bear against the bumper or some other part of the vehicle's body. The standard 15 then is adjusted to a predetermined, initial position with respect to the cylinder 4 in a manner presently to be explained. The valve 37 then may be locked in its closed position and compressed air introduced to the chamber 3 via the fitting 34. The piston 6 and the standard 15 will be displaced vertically so as to elevate the vehicle body a predetermined distance as hereinafter will be described. The latch 40 then may be rotated so as to unlock the valve 37, whereupon the pressure fluid in the chamber 3 will be exhausted rapidly through the port 39 enabling the weight of the vehicle to move the piston 6 downwardly, compressing the spring 14. As the vehicle body moves downwardly, its spring (not shown) also will be compressed or stressed and will cause the body to rebound or oscillate vertically. The amplitude and number of rebounds of the vehicle body will be determined by the efficiency of its shock absorber.

Actuating means designated generally by the reference character 44 is provided to operate the indicating means 25 so as to enable the latter to record the accumulative travel of the standard 15 caused by the amplitude and number of rebounds of the vehicle. The actuating means comprises an arm 46 that is secured at one end to a right-angular bracket 45 having a flange 47 which is journaled on the member 2 for rocking movements by means of a bolt 48. A spring 49 reacts between the head of the bolt 48 and the flange 47 so as to urge the bracket toward the member 2 but enables the bracket to be adjusted longitudinally of the bolt. The bracket 45 includes a second flange 50 which overlies the member 2 and which bears against a plunger 51 mounted in the base and urged upwardly by a spring 52. The arrangement is such that the bracket 45 and the arm 46 constantly are urged to rock in a clockwise direction as viewed in FIGURE 1.

The free end of the arm 46 is provided with a rearwardly projecting operating stylus or follower 53 that normally is accommodated in a vertically extending track or groove 54 formed in the outer plate 27 of the indicating apparatus 25. The left-hand, lower end of the plate 27 is provided with an extension 55, thereby enabling the length of the groove 54 to be longer than otherwise would be possible. The lower end of the groove 54 communicates with an upwardly inclined track or groove 56 which communicates at its upper end with a vertical track or groove 57 that overlies the indicator bar 29a. The lower end of the groove 57 also communicates with a downwardly inclined track 58 that communicates with the upper end of a vertical groove or track 59 that overlies the indicator bar 29b. The upper end of the groove 59 also communicates with an upwardly inclined groove 60 that communicates with the lower end of a vertical groove 61 which overlies the indicator bar 29c. A groove 62 establishes communication between the groove 61 and a groove 63 that overlies the indicator bar 29d and a groove 64 provides communication between the groove 63 and a groove 65 that overlies the indicator bar 29e. The groove 65 includes a lower extension 66 for a purpose presently to be explained. Between the grooves 54 and 56 is a lateral groove 68 the purpose of which also will be explained hereinafter.

The construction and arrangement of the actuating means 44 are such that vertical reciprocation of the indicating means 25 enables the stylus 53 to trace a tortuous path, under the control of the spring 52, from the groove 56 into the groove 57, from the groove 57 into the groove 59 via the groove 58, and thence in succession into the grooves 60, 61, 62, 63, 64, 65, and 66.

To condition the apparatus for operation, the stylus 53 is placed in the groove 54, the base 1 is positioned adjacent one wheel of a vehicle, in the manner previously described and the standard 15 is adjusted, with the valve 37 open, by means of the nut 19 so that the bumper or other part of the vehicle body is accommodated in the groove 18 of the block 17. Once the vehicle bumper or other part engages the block 17 further adjustment of the nut will displace the standard 15 and the piston 16 relatively to the cylinder 4. The nut 19 is rotated in such direction as to cause the stylus to move toward the groove 68. When the stylus is opposite the groove 68 the spring 52 will rock the stylus into the groove 56 and the piston 6 will be at a predetermined position in the cylinder. The valve 37 then may be closed and pressure fluid introduced to the chamber 3 so as to displace the standard 15 upwardly to an initial position. The vertical displacement may be three inches, for example, or any other desired distance. During the vertical displacement of the standard 15 to its initial position the stylus 53 will move downwardly relatively to the groove 56. In the initial position of the apparatus, the vehicle spring will be stressed and the shock absorber to be tested will be elongated.

When the testing apparatus is in its initial position, opening of the valve 37 will enable the pressure fluid to be exhausted through the port 39, whereupon the weight of the vehicle will cause the standard 15 and the indicating apparatus 25 to move downwardly, whereupon the stylus 53 will move from the groove 56 into the groove 57. As the stylus 53 moves from the groove 56 into the groove 57, it will engage the lower end of the indicator bar 29a and displace the latter vertically as is indicated in dotted lines in FIGURE 1.

When the standard 15 reaches its lowest position under the influence of the downward movement of the vehicle and the vehicle springs cause the vehicle body to rebound, the spring 14 will exert a force on the piston 6 and cause the standard 15 to move upwardly also. As the standard moves upwardly, the indicating means 25 also will move upwardly whereupon the stylus 53 will emerge from the lower end of the groove 57. The spring 52 will cause the stylus to be deflected into the groove 58 and thence into the groove 59 so as to displace the indicator bar 29b downwardly, as is indicated in the dotted lines in FIGURE 1.

At the top of its rebound, assuming that the shock absorber permits the vehicle body to move upwardly past its normal position, the body once again will move downwardly causing the stylus to emerge from the groove 59 and enter the groove 61 via the groove 60 and displace the indicator bar 29c upwardly. Further rebounds will cause the stylus 53 to move seriatim into the grooves 63, 65 and 66 so as to displace in succession the indicator bars 29b and 29e. Should rebounds continue following displacement of the indicator bar 29e, the stylus 53 will reciprocate vertically in the grooves 65 and 66.

Each of the indicator bars 29 will be provided with indicia by means of which the extent of its displacement by the actuating mechanism 45 can be determined. By adding or accumulating the displacement of all the displaced indicator bars, a total displacement figure may be determined. By comparison of this displacement figure with displacement data representative of a new, effective shock absorber, the relative efficiency of the shock absorber under test can be determined.

When the shock absorber at one wheel of the vehicle has been tested, the operator may remove the apparatus from engagement with the vehicle and return the stylus 53 to the groove 54. Such movement of the stylus is accomplished by compressing the spring 49 and rocking the arm 46 toward the groove 54. Thereafter, the operator may restore the displaced indicator bars 29 to their initial positions and proceed with the testing of the second and subsequent shock absorbers.

The apparatus disclosed in FIGURES 3, 4 and 5 differs from the earlier described embodiment only in the indicating mechanism and the actuating means therefor. In this embodiment the indicating mechanism 70 comprises a hollow housing 71 that is welded or otherwise suitably fixed to the flange 26 of the carrier 22 and has a front plate 72 which is provided with an opening 73. Rotatably mounted in the opening 73 is an indicator dial 74 which is journaled on a shaft 75 that may be secured to the flange 26. An adjusting knob 76 is secured to and projects forwardly from the dial 74. Secured to the inner surface of the dial 74 is a wheel 77 having operating ratchet teeth 78 at its periphery. All of the teeth are inclined in the same direction.

The actuating mechanism 79 comprises a pair of upstanding rack bars 80 and 81 pivotally mounted at their lower ends by bolts 82 on the member 2. The bar 80 extends into the housing 71 and is provided with operating ratchet teeth 83 which mesh with the teeth 78. The bar 80 is urged yieldably toward the wheel 77 by a leaf spring 84 that is secured at one end of the housing 71 by screws 85 and which has as its other end a post 86 which extends through an opening in the housing 71 and engages the bar 80. The bar 81 has operating ratchet teeth 87 in mesh with the teeth 78 and is urged yieldably into engagement with the wheel 77 by a leaf spring 88 anchored at one end by screws 89 and having a post 90 at its other end in engagement with the bar 81. As is illustrated in FIGURE 5, the teeth 83 and 87 are inclined in opposite directions, thereby enabling the dial 74 to be rotated freely in a counterclockwise direction, but preventing clockwise rotation of the dial relative to the actuator bars 80 and 81.

To condition the apparatus shown in FIGURES 3–5 for operation, the valve 37 is opened and the standard 15 is adjusted by manipulation of the nut 19 so as to enable the bumper or other part of the vehicle body to be accommodated in the groove 18 of the block 17. The nut then is manipulated to locate the standard 15 and the piston 6 in a predetermined position relative to the cylinder 4. This position may be determined by reference to a mark 91 on the plate 71 and a mark 92 on the bar 81 which is visible through a window 93 in the plate 71. The valve 37 is then closed. Thereafter, the standard is elevated a selected distance such as three inches by the introduction of pressure fluid to the chamber 3 so as to elevate the vehicle body to an initial position. When the standard has been raised to its initial position the dial 74 should be rotated to locate a zero or initial position index mark 94 in such position with respect to a reference mark 95 on the plate 72 as to correspond to the vertical displacement of the standard from its initial position. Thus, if the standard is displaced three inches, the dial should be so adjusted that the zero index 94 is offset from the reference 95 an amount corresponding to three inches. This relationship is illustrated in FIGURE 3.

Following adjustment of the dial 74, the valve 37 may be opened to permit substantially instantaneous exhausting of the fluid from the cylinder 4 whereupon the weight of the vehicle will cause the standard and the housing 70 to move downwardly. As the housing 70 moves downwardly, the teeth 87 on the bar 81 will effect counterclockwise rotation of the dial 74, the teeth 78 on the wheel 77 being able to bypass the teeth 83 on the bar 80 due to the resilience of the spring 84. When the standard reaches its initial position, the dial 74 will have been rotated to a position in which the zero index 94 is opposite the reference 95. The standard will move downwardly past the initial position accompanied by counterclockwise rotation of the dial 74. As the standard reaches its lowest position, the vehicle springs will cause the vehicle body to rebound and the standard will be raised by the spring 14 so as to remain in contact with the vehicle, whereupon the teeth 78 and 83 will react to impart further counterclockwise rotation to the dial 74. In this instance, the teeth 87 will be cammed out of the path of the teeth 78 due to the resilience of the spring 88. The toothed wheel 77 and the toothed bars 80 and 81 thus can be considered unidirection clutch means for effecting unidirectional rotation of the indicator dial 74 in response to movement of the standard 15 in either of its two opposite directions of movement.

Continued rebounding of the vehicle body will effect continued counterclockwise movemnt of the dial 74 so as to enable the extent of its rotation to be determined by reference to the indicia on the dial 74 and the mark 95. The amount of rotation of the dial 74 represents the accumulative travel of the standard 15 and can be compared to data obtained from the testing of a new shock absorber, thereby enabling the efficiency of the shock absorber under test to be determined.

The disclosed embodiments are representative of presently preferred forms of the invention, but are intended to be illustrative rather than definitive thereof. The invention is defined in the claims.

I claim:

1. Apparatus for testing shock absorbers or the like, said apparatus comprising a base member; a standard member; means mounting said standard member on said base member for reciprocating movement in opposite directions; pressure fluid inlet means in said base member for introducing pressure fluid thereto; resilient means acting between said members and constantly urging said standard member in one direction; means for exhausting pressure fluid from said base member; movable indicator means carried by one of said members for indicating the accumulative movement of said standard in both of said directions; and actuating means acting between said indicator means and the other of said members to effect movement of said indicator means in response to movement of said standard member in either of said directions.

2. The apparatus set forth in claim 1 including means for positioning said standard member in a predetermined position relative to said base member.

3. The apparatus set forth in claim 1 wherein said inlet means is located in such position that pressure fluid introduced to said base member assists said resilient means.

4. The construction set forth in claim 1 wherein said indicator means comprises a rotatable member.

5. The construction set forth in claim 4 including unidirectional clutch means interconnecting said actuating means and said rotatable member for rotating the latter.

6. The construction set forth in claim 5 wherein said clutch means comprises a ratchet device.

7. The construction set forth in claim 6 wherein said ratchet device comprises a toothed wheel fast on said rotatable member and complementary teeth on said actuating means.

8. The construction set forth in claim 4 including a toothed ratchet wheel fast on said rotatable member and wherein said actuating means comprises a toothed rack in mesh with said wheel.

9. The construction set forth in claim 1 wherein said indicator means comprises a plurality of slide members some of which are slideable in one direction from a neutral position and the others of which are slideable in a direction opposite to said one direction from a neutral position.

10. The construction set forth in claim 9 including track means in communication with each of said slide members and wherein said actuating means comprises a follower accommodated in said track means.

11. The construction set forth in claim 10 wherein said slide members are arranged seriatim and wherein said track means defines a tortuous path extending to each of said slide members.

12. Shock absorber testing apparatus comprising a cylinder member; a piston reciprocable in said cylinder member; a standard member carried by said piston for reciprocation therewith; indicator means carried by said standard member for indicating the accumulative travel of said standard member in both directions of its reciprocation; actuator means carried by said cylinder member;

operating means interconnecting said actuator means and said indicator means for operating the latter in response to movement of said standard member in each direction of its reciprocation; pressure fluid inlet means in said cylinder member for introducing thereto pressure fluid to effect displacement in one direction of said standard member; means for exhausting pressure fluid from said cylinder member; and spring means acting between said cylinder member and said standard member and urging the latter in said one direction.

13. Apparatus for testing shock absorbers or the like, said apparatus comprising a base member; a standard member; means mounting said standard member on said base member for reciprocating movement in opposite directions; rotatable indicator means carried by one of said members; and unidirectional clutch means interconnecting said indicator means and the other of said members for rotating said indicator means in one direction only in response to movement of said standard member in either of its directions of movement.

14. The apparatus set forth in claim 13 wherein said unidirectional clutch means comprises a pair of actuator members straddling said rotatable indicator means, and resilient means yieldably urging said actuator members into engagement with said indicator means.

15. The apparatus set forth in claim 14 wherein each of said actuator members comprises a toothed rack and wherein said indicator means includes a toothed wheel in mesh with each of said racks.

16. The apparatus set forth in claim 15 wherein the teeth on said wheel are inclined in the same direction and wherein the teeth on said racks are inclined in opposite directions.

References Cited

UNITED STATES PATENTS

| | | | |
|---|---|---|---|
| 1,560,685 | 11/1925 | Gilman | 73—11 |
| 1,561,154 | 11/1925 | Gilman | 73—11 |
| 2,923,147 | 2/1960 | MacMillan | 73—11 |
| 3,038,973 | 6/1962 | Alpert | 73—492 |

FOREIGN PATENTS 373,170　　5/1932　Great Britain.

RICHARD C. QUEISSER, *Primary Examiner.*

J. R. FLANAGAN, *Assistant Examiner.*